United States Patent [19]

Horner et al.

[11] 4,392,709

[45] Jul. 12, 1983

[54] METHOD OF MANUFACTURING HOLOGRAPHIC ELEMENTS FOR FIBER AND INTEGRATED OPTIC SYSTEMS

[75] Inventors: Joseph L. Horner, Cambridge; Jacques E. Ludman, Westford, both of Mass.

[73] Assignee: The United States of America as represented by the Secretary of the Air Force, Washington, D.C.

[21] Appl. No.: 201,860

[22] Filed: Oct. 29, 1980

[51] Int. Cl.³ ............................................. G03H 1/04
[52] U.S. Cl. ..................................... 350/3.83; 350/3.6; 350/3.72; 350/96.19
[58] Field of Search .................. 350/3.6, 3.7, 3.72, 350/3.83, 3.84, 96.18, 96.19, 96.20, 96.21

[56] References Cited

U.S. PATENT DOCUMENTS

| | | | |
|---|---|---|---|
| 3,578,845 | 5/1971 | Brooks et al. | 350/3.72 X |
| 3,586,412 | 6/1971 | Leith | 350/3.72 |
| 3,666,345 | 5/1972 | Maslowski | 350/3.70 X |
| 3,864,016 | 2/1975 | Dakss et al. | 350/96.19 X |
| 3,885,856 | 5/1975 | Ostrowsky et al. | 350/3.70 |
| 3,915,548 | 10/1975 | Opittek et al. | 350/3.72 |
| 3,975,082 | 8/1976 | Winzer | 350/96.19 |
| 4,057,319 | 11/1977 | Ash et al. | 350/96.19 X |
| 4,140,362 | 2/1979 | Tien | 350/3.72 |
| 4,310,216 | 1/1982 | Pellaux | 350/3.72 |
| 4,337,993 | 7/1982 | Kompfner | 350/96.19 |

OTHER PUBLICATIONS

Pennington et al., "Fast Wave Optical Guide Couplers Using...", *IBM Tech. Discl. Bull.*, vol. 13, No. 8, Jan. 1971, pp. 2280–2281.
Ash et al., "Holographic Coupling to Integrated Optical Circuits", *1973 Eur. Microwave Conf.:vol. I*, Brussels, Sep. 1973, p. 4.
Case et al., "Multi-Mode Holographic Waveguide Coupler", *Optics Commun.*, vol. 15, No. 2, Oct. 1975, pp. 306–307.
Leite et al., "Optical-Fibre-Bundle Holographic Coupler", *Microwaves, Optics & Acoustics*, vol. 2, No. 2, Mar. 1978, pp. 45–54.
Nishihara H., et al., "Holdcoupler: A Novel Coupler for Optical Circuits," *IEEE Jour. of Quantum Electronics*, Sep. 1975, pp. 794–796.

*Primary Examiner*—John D. Lee
*Attorney, Agent, or Firm*—Donald J. Singer; Jacob N. Erlich

[57] ABSTRACT

An improved method of manufacturing holographic elements for fiber and integrated optic systems in which a spatially and temporally coherent beam of electromagnetic radiation is divided into two beam paths. The first beam path and the second beam path are optically aligned with each other so that the beams impinge upon a photosensitive medium and interfere therein. Additionally, a spherically diverging wavefront is formed within one of the paths while an identical polarization is maintained in the beams of the two beam paths. By appropriate processing of the photosensitive medium a holographic element is formed which is substantially improved over holographic elements for fiber and integrated optic systems produced by manufacturing techniques of the past.

1 Claim, 2 Drawing Figures

METHOD OF MANUFACTURING HOLOGRAPHIC ELEMENTS FOR FIBER AND INTEGRATED OPTIC SYSTEMS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to holographic elements, and, more particularly, to the manufacture of holographic elements for use with fiber and integrated optic systems.

Holography is a technique for recording, and later reconstructing, the amplitude and phase distribution of a coherent wave disturbance. Generally, the technique utilized for providing a hologram is accomplished by recording the pattern of interference between an unknown wave of interest and a known wave. These waves, one for example, reflected from an object, usually called the object wave, and the other which bypasses the object, usually called the reference wave, strike a light-sensitive recording medium, such as a photographic film or plate. Thus, incident on the recording medium is the sum of the light from the object and the mutually coherent reference wave.

While all light-sensitive recording media respond only to light intensity, none the less in the pattern of interference between the two waves there is preserved a complete record of the amplitude and the phase distribution of one of the waves with respect to the other. Amplitude information is preserved as a modulation of the depth of the interference fringes, while phase information is preserved as variations of the positions of the fringes.

The photographic recording obtained is known as a hologram although this record generally bears no resemblance to the original object, but rather is a collection of many fine fringes which appear in rather irregular patterns. None the less, when this photographic transparency (hologram) is illuminated by coherent light corresponding to the reference wave one of the transmitted wave components is an exact duplication of the original object wave.

Recently great use has been made of holographic optical elements for use in fiber optic communications links and integrated optics systems. Examples of such holographic optical elements (holograms) for use in fiber optic communication links and integrated optic systems can be found in the form of multiplexer/demultiplexers of the type disclosed in the inventors' U.S. patent application Ser. No. 144,819 (now U.S. Pat. No. 4,359,259) filed Apr. 29, 1980, in couplers to waveguides such as set forth in U.S. Pat. No. 3,885,856 issued May 27, 1975. In all of the above applications an optical fiber is utilized with one of the beams in order to produce the desired hologram. Unfortunately, the utilization of an optical fiber within the holographic manufacturing technique produces a so-called speckle pattern, which is due to a random distribution of intensities and polarization. Since the interference phenomenon is sensitive to both these parameters, there will be substantial areas on the hologram where a poor interference pattern is recorded. Consequently, the overall efficiency of the system is considerably reduced.

SUMMARY OF THE INVENTION

The instant invention overcomes the problems encountered in the past by providing an improved method of manufacturing a holographic element for fiber optic and integrated optic applications.

The improved method of manufacturing a holographic element (hologram) of this invention replaces the fiber path or optical fiber with a convergent lens and if necessary beam steering mirrors in order to direct the light beam when making the holographic element. In so doing this invention assures that a high quality holographic pattern is laid down over 100% of the area of the photosensitive medium in common with the pair of beams utilized in making the hologram. The result of using the technique of this invention in manufacturing holographic elements is that it produces an improvement of greater than approximately 25% over the techniques of the past.

It is therefore an object of this invention to provide an improved method of manufacturing holographic elements for fiber optic and integrated optic systems.

It is another object of this invention to provide a method of manufacturing holographic elements which eliminates the speckle pattern problem inherent in multi-mode optical fibers when these fibers are utilized in the manufacturing or fabricating of holographic optical elements.

It is a further object of this invention to provide a method of manufacturing holographic elements in which a single convergent lens is utilized to simulate the output of an optical fiber.

It is still another object of this invention to provide an improved method of manufacturing holographic elements which is both economical as well as capable of utilizing conventional, currently available components in the procedure.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 1:
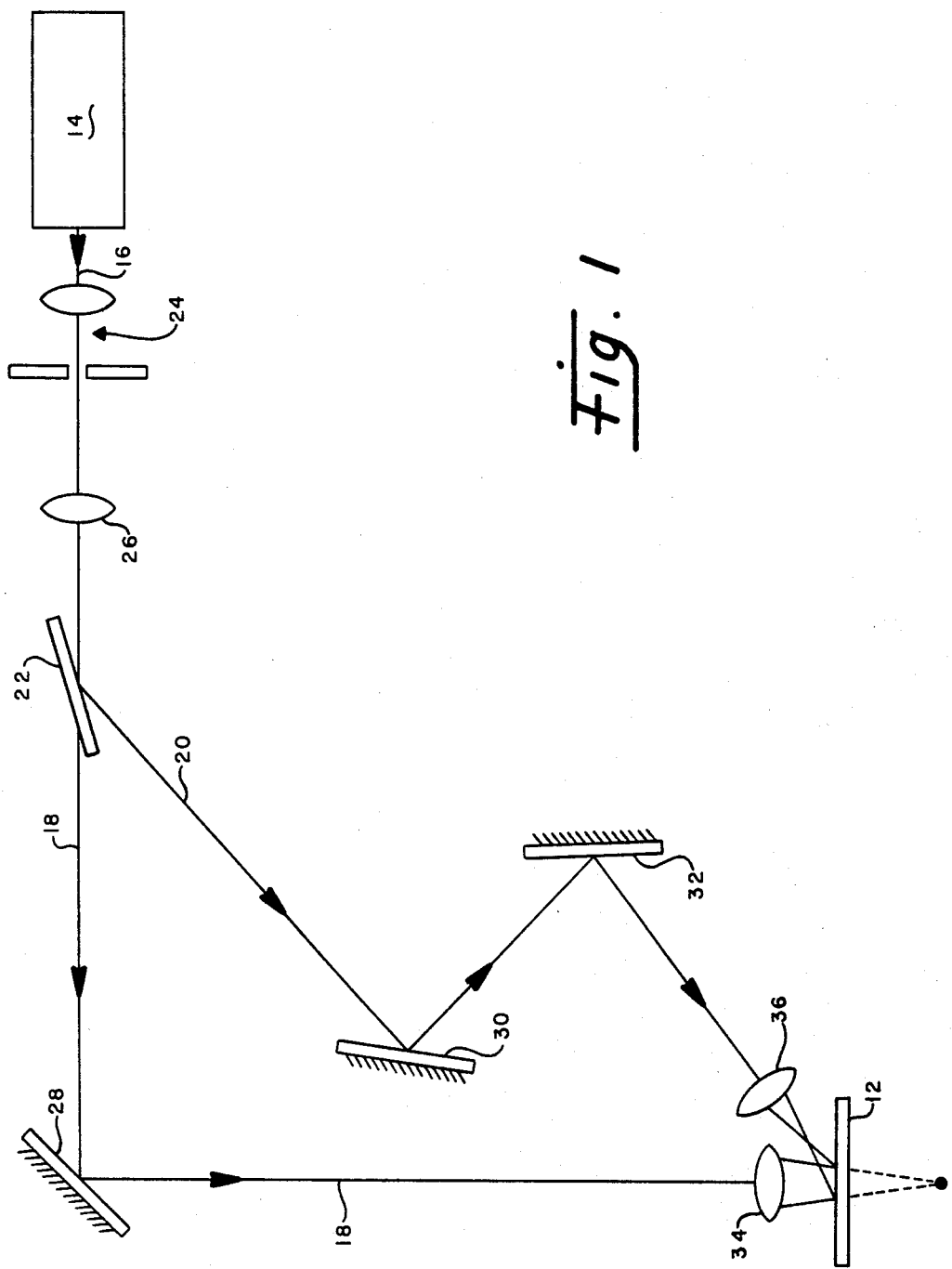
Figure 2:
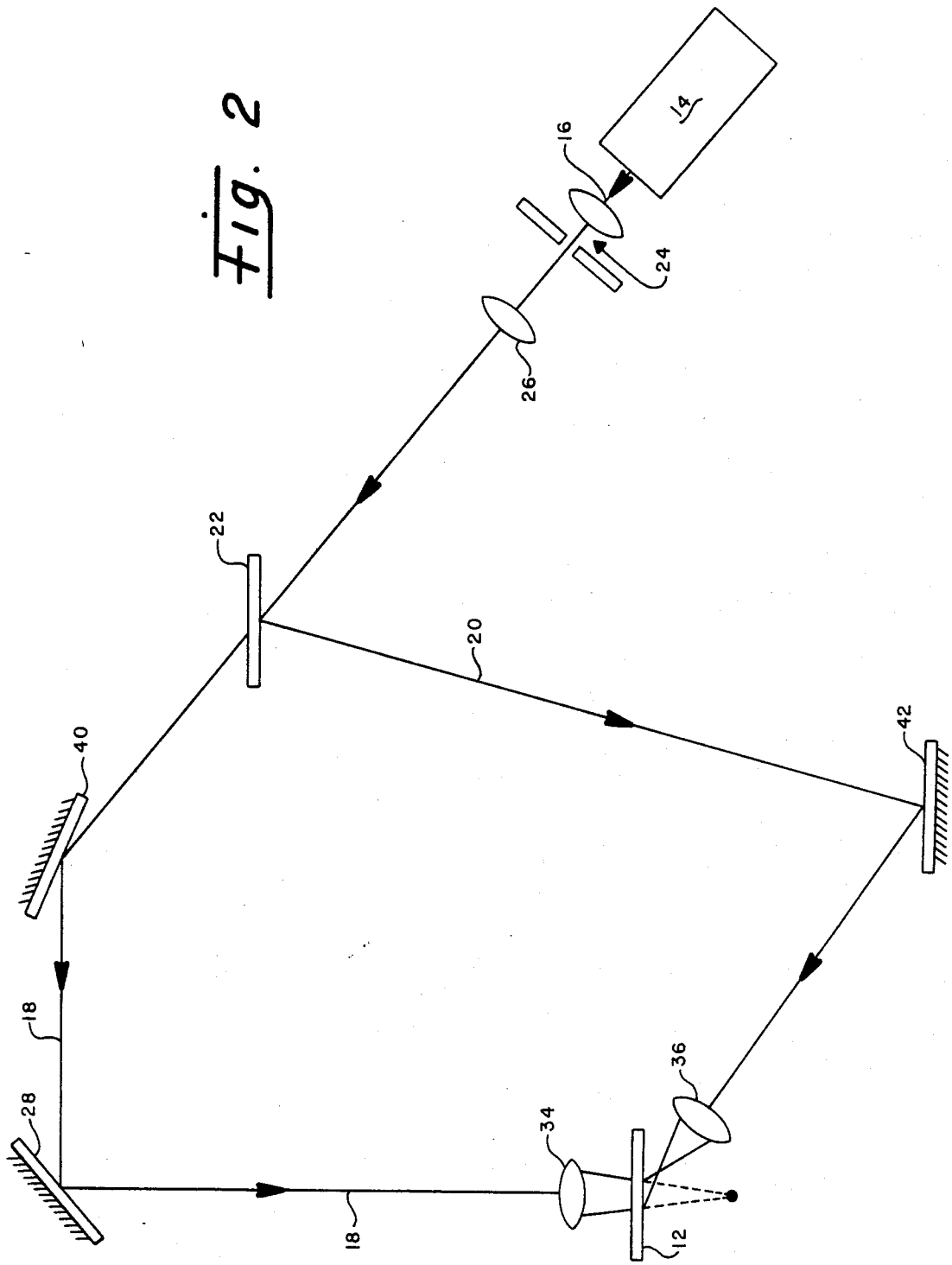

FIG. 1 is a schematic representation of the technique of this invention for manufacturing holographic elements; and FIG. 2 is a schematic representation of a modification of the technique of this invention for manufacturing holographic elements.

DETAILED DESCRIPTION OF THE PREFERRED EMBODIMENT

Reference is now made to FIG. 1 of the drawing in order to describe the manufacturing technique of this invention utilized to make holographic elements which in the past required within one of the beam paths an optical fiber. Such past techniques produced a resultant speckle pattern which decreased the overall efficiency of the system which incorporated the hologram therein.

The procedure of this invention incorporates therein the utilization of a photosensitive medium 12 described more fully in detail hereinbelow and any conventional source of temporally and spatially coherent, monochromatic electromagnetic radiation 14. The source of electromagnetic radiation may be in the form of any suitable laser such as, for example, an argon laser.

Laser 14 produces a beam 16 of electromagnetic radiation. Beam 16 is divided into two portions or paths, hereinafter referred to as beams 18 and 20, by any conventional beam dividing means such as a conventional beam splitter 22. Spatial filtering of beam 16 may be accomplished by any conventional spatial filtering device, such as a lens and pinhole filter 24 while collimation of beam 16 may be achieved by any conventional collimating device such as lens 26. Additionally, in the method of this invention for manufacturing a holographic element, the path length of beams 18 and 20 are made substantially equal to provide the appropriate interference between beams 18 and 20 within photosensitive medium 12.

Still referring to FIG. 1 of the drawing, a more detailed description of the photosensitive medium 12 is given hereinbelow. Photosensitive medium 12 is made up of, for example, a photographic emulsion having the appropriate characteristics, a photo resist film, a dichromated gelatin film or the like. The specific choice depends upon the properties needed for a specific application of the holographic elements produced by this invention. Furthermore, photosensitive medium 12 is made of sufficient thickness and exposed appropriately to achieve a high diffraction efficiency (i.e., 80%) and yet not so thick or inappropriately oriented that it will have too narrow a bandwidth of operation (i.e., ±15% about the central wavelength).

Both of the paths of beams 18 and 20 are of substantially identical length as indicated hereinabove. This is achieved by the appropriate placing of any suitable directing element such as mirror 28 in the path of beam 18 and mirrors 30 and 32 in the path of beam 20. Each of the paths of beams 18 and 20 utilize a lens 34 and 36, respectively, within the paths so as to direct each beam 18 and 20, respectively, to interfere upon the photosensitive medium 12.

In general, one of the beams 18 passes through photosensitive medium 12 as a converging beam while the other beam passes through photosensitive medium 12 as a diverging beam. However, it should be noted that both beams may be diverging or converging, if desired, depending on the application in which the holographic element is to be used. This invention eliminates the use of an optical fiber within the beam paths by substituting therefor an air path 38 and an appropriate focusing element such as lens 36 which produces a diverging wavefront similar to that emerging from the fiber it replaces, but thereby eliminating the problems associated with optical fibers utilized in the path.

Lens 36 (or 34) is arranged to focus beam 20 (or 18) at a point in space previously occupied by, for example, the end of an optical fiber. In so doing, such a procedure also simulates the output of a perfect, i.e., monomode optical fiber. Consequently, the technique of this invention eliminates the speckle pattern problem which is associated with optical fibers. As a result of the utilization of the technique of this invention, a high quality interference pattern is recorded in all regions within photosensitive medium 12. Thereby, the overall efficiency of the holographic element produced by this invention is substantially increased. All output problems associated with optical fibers being changed or, in some instances, when the same fiber is flexed or bent is substantially eliminated.

The converging beam 18 and diverging beam 20 meet and interfere in photosensitive medium 12, which, after appropriate development, bleaching or other processing, records the resultant fringe pattern as a refractive index or phase change in the medium. Judicious choice of angular relationship between beams 18 and 20 assist in lowering reflection losses while obtaining high dispersion and reasonable beam intensity throughout the interference region. The ratio of the two beam intensities would preferably be unity at the center of the pattern, although it varies by a factor of two across the interference region due to the oblique angle between the input of path 20 and the photosensitive medium 12. The use of identical path lengths for beams 18 and 20 insures both a high coherence between the two beams and a high modulation of the interference fringes where the beam intensities are similar.

In making the holographic element, photosensitive medium 12 is exposed by beam 18 and 20. For example, using a dichromated gelatin film about 15 micrometers in thickness as the photosensitive medium 12, an exposure of over 100 millijoules for beam 16 would yield maximum diffraction efficiency, although it should be realized that this procedure is not limited to a particular exposure. Subsequent development of photosensitive medium 12 produces a holographic element which may be utilized as an optical coupler as described in U.S. Pat. No. 3,885,856 or as a multiplexer/demultiplexer as described in the inventors' aforementioned U.S. patent application Ser. No. 144,819 filed Apr. 29, 1980.

It should be realized, however, that the method of this invention is not limited to the particular embodiment illustrated in FIG. 1 of the drawing in which the manufacture of a transmission holographic element is formed but may be modified within the scope of this invention by for example, directing beam 20 on the other side of the photosensitive medium 12 as illustrated in FIG. 2 of the drawing thereby producing a reflective holographic element. The essential factor to recognize with this invention is not the exact positioning of the two beams but the elimination of an optical fiber in the manufacturing technique of holographic elements so as to eliminate the speckle pattern problem.

As an example of a further technique for manufacturing a holographic element within the confines of this invention reference is now made to FIG. 2 of the drawing. Also, to avoid obvious redundancies, since the basic procedure and concept involved in the making of the holographic element set forth in FIG. 2 of the drawing is essentially the same as described hereinabove with reference to the technique set forth with respect to FIG. 1 of the drawing, a detailed explanation of similar procedures and concepts will not be repeated. Furthermore, all like elements set forth in FIG. 2 which have been previously described and referenced by a particular reference numeral with respect to FIG. 1 of the drawing will have a similar reference numeral in FIG. 2 of the drawing.

The essential difference between the procedure set forth will respect to FIG. 1 of the drawing and the procedure set forth in FIG. 2 is the relocation of the reflecting and focusing elements. For example, substantially 100% reflective mirrors 40 and 42 are provided in order to direct beam 18 around one side of photosensitive medium 12 and beam 20 to the other side of photosensitive medium 12. Otherwise, the setup for fabrication set forth in FIG. 2 of the drawing is identical to the setup depicted in FIG. 1 of the drawing. In both instances the interference within photosensitive medium 12 takes place, in which the photosensitive medium 12 records the resultant fringe pattern as a refractive index or phase change in the medium.

Subsequent exposure and development of the photosensitive medium 12 in order to produce the holographic element is accomplished in the same manner described hereinabove with respect to the fabrication of the holographic elements set forth in FIG. 1 of the drawing.

Although this invention has been described with reference to a particular technique it will be understood to those skilled in the art that this invention is also capable of modification of this technique within the spirit and scope of the appended claims.

We claim:

1. An improved method of manufacturing a reflective holographic element for fiber and integrated optic systems in order to substantially eliminate speckle pattern problems, comprising the steps of:
   (a) providing a photosensitive medium of sufficient thickness to achieve a high diffraction efficiency of approximately 80% and a broad bandwidth of operation of approximately ±15% about a central wavelength;
   (b) providing a spatially and temporally coherent beam of electromagnetic radiation adjacent said photosensitive medium;
   (c) dividing said beam of electromagnetic radiation into a first beam following a first path of preselected length and a second beam following a second path of preselected length;
   (d) placing reflecting elements in at least one of said paths in order to make said predetermined lengths of said first path and said second path substantially equal;
   (e) optically aligning said first beam path and said second beam path so that said first beam and said second beam impinge with each other on opposite sides of said photosensitive medium and interfere therein;
   (f) placing a lens within each of said first and said second beam paths adjacent said photosensitive medium in order to form a spherically converging wavefront within said first beam path and a spherically diverging wavefront within said second beam path;
   (g) maintaining an angular relationship between said diverging beam and said converging beam so as to produce low reflection losses while obtaining substantially high dispersion throughout the interference region within said photosensitive medium;
   (h) maintaining identical polarization in said first and said second beams; and
   (i) processing said photosensitive medium in order to form said holographic element having said broad bandwidth of operation.

* * * * *